US012005010B2

(12) United States Patent
Nicholson et al.

(10) Patent No.: US 12,005,010 B2
(45) Date of Patent: Jun. 11, 2024

(54) PERSONAL LIFT MECHANISM

(71) Applicant: CONQUERING HORIZONS LTD, Exeter (GB)

(72) Inventors: Garth Nicholson, Exeter (GB); Samuel Rees, Exeter (GB)

(73) Assignee: Conquering Horizons Lid., Exeter (GB)

( * ) Notice: Subject to any disclaimer, the term of this patent is extended or adjusted under 35 U.S.C. 154(b) by 695 days.

(21) Appl. No.: 16/972,979

(22) PCT Filed: Jun. 5, 2019

(86) PCT No.: PCT/GB2019/051555
§ 371 (c)(1),
(2) Date: Dec. 7, 2020

(87) PCT Pub. No.: WO2019/234421
PCT Pub. Date: Dec. 12, 2019

(65) Prior Publication Data

US 2021/0251827 A1 Aug. 19, 2021

(30) Foreign Application Priority Data

Jun. 7, 2018 (GB) ..................................... 1809390

(51) Int. Cl.
*A61G 5/10* (2006.01)
*A61G 7/10* (2006.01)
*B66F 7/06* (2006.01)

(52) U.S. Cl.
CPC ......... *A61G 5/1059* (2013.01); *A61G 5/1081* (2016.11); *A61G 7/1017* (2013.01);
(Continued)

(58) Field of Classification Search
CPC .. A61G 5/1056; A61G 5/1059; A61G 5/1081; A61G 7/1017; A61G 7/1048;
(Continued)

(56) References Cited

U.S. PATENT DOCUMENTS 5,435,404 A 7/1995 Garin, III
5,524,952 A * 6/1996 Czech .................... B60N 2/245 296/65.12

(Continued)

FOREIGN PATENT DOCUMENTS

CN 201469544 U 5/2010
CN 201930154 U 8/2011

(Continued)

OTHER PUBLICATIONS

UK Intellectual Property Office, Combined Search and Examination Report dated Dec. 4, 2018 in GB Application No. GB1809390.6.

(Continued)

*Primary Examiner* — Tyrone V Hall, Jr.
(74) *Attorney, Agent, or Firm* — David G. Woodral; Gable Gotwals

(57) ABSTRACT

A personal lift mechanism and method are disclosed. The personal lift mechanism comprises: a lift having a base structure which pivotally retains a pair of struts which are pivotally coupled with a lift platform; an actuator coupled with at least one of the pair of struts; and a damper coupled with the actuator and operable to dissipate kinetic energy transferred between the lift platform and the actuator. In this way, less mechanically-robust components are required for the lift mechanism, damage to those components and the actuator is less likely, and any load on the lift platform and/or base structure will experience reduced shock due to the energy being instead dissipated within the damper.

20 Claims, 6 Drawing Sheets

(52) U.S. Cl.
CPC ......... *A61G 7/1048* (2013.01); *A61G 7/1059* (2013.01); *B66F 7/0608* (2013.01)

(58) Field of Classification Search
CPC ....... A61G 7/1059; B66F 11/042; B66F 5/04; B66F 7/0625; B66F 7/08; B66F 7/085
See application file for complete search history.

(56) References Cited

U.S. PATENT DOCUMENTS

| | | | | |
|---|---|---|---|---|
| 2005/0046129 | A1* | 3/2005 | Antonishak .......... | A61G 5/1059 280/47.4 |
| 2007/0227787 | A1* | 10/2007 | Kuramoto ............. | A61G 5/045 180/65.1 |
| 2009/0146389 | A1 | 6/2009 | Borisoff | |
| 2011/0248471 | A1 | 10/2011 | Springer | |
| 2016/0270523 | A1 | 9/2016 | Smith et al. | |
| 2016/0310334 | A1 | 10/2016 | Bliem | |

FOREIGN PATENT DOCUMENTS

| | | | |
|---|---|---|---|
| CN | 202376334 | U | 8/2012 |
| CN | 203158147 | U | 8/2013 |
| CN | 106137578 | A | 11/2016 |
| CN | 106923977 | A | 7/2017 |
| DE | 2703727 | A1 | 8/1978 |
| DE | 102013104050 | B4 | 10/2014 |
| EP | 1506760 | A1 | 2/2005 |
| EP | 2050424 | A1 | 4/2009 |
| GB | 2275029 | A | 8/1994 |
| KR | 101429950 | B1 | 8/2014 |
| TW | M514837 | U | 1/2016 |

OTHER PUBLICATIONS

European Patent Office, International Search Report and Written Opinion prepared by the European Patent Office for PCT/GB2019/051555, dated Aug. 22, 2019.

* cited by examiner

PERSONAL LIFT MECHANISM

FIELD OF THE INVENTION

The present invention relates to a personal lift mechanism and method.

BACKGROUND

Personal lift mechanisms are known and are generally incorporated into apparatus where it is desired to lift, elevate or change the height of the apparatus to suit the user of that apparatus. Although various lift mechanisms exist, they each have their own shortcomings. Accordingly, it is desired to provide an improved lift mechanism.

SUMMARY

According to a first aspect, there is provided a personal lift mechanism, comprising: a lift having a base structure which pivotally retains a pair of struts which are pivotally coupled with a lift platform; an actuator coupled with at least one of the pair of struts; and a damper coupled with the actuator and operable to dissipate kinetic energy transferred between the lift platform and the actuator.

The first aspect recognises that a problem with existing lift mechanisms is that the arrangement is typically such it is highly rigid which results in high stresses on component parts of the lift mechanism due to, for example, a rapid change in force applied to the lift platform resulting from a rapid change in the load of the lift platform in response to the heavy placement of a user on that platform or movement of the base structure in response to a rapid deceleration of the apparatus (for example, when travelling over rough terrain) to which the personal lift mechanism is attached. These stresses result in, at the least, the requirement for appropriately-specified component parts and linkages of the lift mechanism and, at worst, damage to those component parts, with actuators being particularly susceptible.

Accordingly, a lift mechanism is provided. The lift mechanism may be a personal lift mechanism for lifting people-like objects. The lift mechanism may comprise a lift which has a base or retaining structure. The base structure may pivotally or rotatably retain or receive a pair of struts. The struts may be pivotally or rotatably coupled or connected to a lift platform. The lift mechanism may comprise an actuator which is coupled or connected with one or more of the pair of struts. The lift mechanism may also comprise a damper which is coupled or connected with the actuator. The damper may operate to dissipate or deplete kinetic energy and/or to accommodate displacement transferred between the lift platform and the actuator. In this way, less mechanically-robust components are required for the lift mechanism, damage to those components and the actuator is less likely, and any load on the lift platform and/or base structure will experience reduced shock due to the energy being instead dissipated within the damper. This can help to isolate movements of a chassis whilst riding over rough terrain (thus isolating the rider from chassis shocks and/or displacements).

In one embodiment, the damper may operate to dissipate or deplete kinetic energy and/or to accommodate displacement transferred from or caused by the lift platform on the actuator.

In one embodiment, the lift comprises a parallelogram lift, the struts are located to be parallel and the lift is operable to retain the lift platform in a fixed attitude during pivoting of the pair of struts to change a height of the lift platform in elevation direction between a lowered position and a raised position. Accordingly, the lift may comprise a parallelogram lift where the struts are arranged in a parallel or coextending configuration as they rotate about the base structure. The lift may maintain the lift platform in a selected attitude or orientation as the struts pivot. The pivoting of the struts may change the height of the lift platform elevationally between a lowered or un-elevated position and a raised or elevated position.

In one embodiment, the actuator is operable to pivot the at least one of the pair of struts to change the height of the lift platform. Accordingly, operation of the actuator may pivot one or more of the struts to adjust the height or elevation of the lift platform.

In one embodiment, the actuator is pivotally coupled with a distal one of the pair of struts. Accordingly, the actuator may pivotally or rotatably couple or connect with that one of the pair of struts which is located furthest away from the actuator in its extending direction. This provides more length for the actuator in its retracted configuration than if it were connected with the nearer of the pair of struts.

In one embodiment, the actuator is pivotally coupled with a distal face of the distal one of the pair of struts. Accordingly, the actuator may be pivotally or rotatably connected or coupled with the face which is furthest away from the actuator in its extending direction. Again, this provides additional length for the actuator in its retracted configuration compared with coupling at another location on that strut.

In one embodiment, the actuator is positioned to extend through apertures in the pair of struts. By providing apertures in the pair of struts, the actuator can pass through the nearest strut to the furthest strut, which provides for a more compact lift.

In one embodiment, the actuator comprises a linear actuator operable to change its length between an extended position in which the lift platform is in the raised position and a retracted position in which the lift platform is in the lowered position. Accordingly, the actuator may comprise a linear or laterally extending actuator which operates to change or adjust its length to adjust the height of the lift platform. It will be appreciated that a variety of linear actuators may be provided and that electromechanical linear actuators such as screw-type actuators are particularly susceptible to shock damage.

In one embodiment, the damper is located in series with the actuator. Accordingly, the damper may be arranged mechanically in series with the actuator; that is to say, the actuator may be coupled with the strut at one end and coupled with the damper at its other end.

In one embodiment, the damper is coupled with the base structure. Accordingly, the actuator may be coupled at one end with its strut and may be coupled at its other end with the damper, with the other end of the damper being coupled with the base structure.

In one embodiment, the damper is coupleable with the base structure at different positions towards the pair of struts. Accordingly, the damper may be coupled or connected with the base structure at different locations which are at different distances from the pair of struts.

In one embodiment, the damper is pivotally coupled with the actuator. Accordingly, the damper may be pivotally or rotatably coupled or connected with the actuator.

In one embodiment, the lift mechanism may comprise a pivoting coupler and wherein a displacement of the actuator in a first direction due to the kinetic energy is translated by the pivoting coupler to a displacement of the damper in a second direction. Accordingly, a pivoting or rotating coupler or connector may be provided. A displacement or translation of the actuator in one direction resulting from the kinetic energy applied to the actuator from the lift platform and through the struts may be translated or redirected by the pivoting coupler to a displacement or movement of the damper in another direction. This provides for a more compact arrangement than if the displacement of the damper was in the same direction as the actuator.

In one embodiment, the second direction generally opposes the first direction. Arranging for the displacements to occur in opposite, reverse or counter directions further improves the compactness of the lift.

In one embodiment, the first direction is generally away from the pair of struts and the second direction is generally towards the pair of struts. Hence, the pivoting coupler reverses the direction of movement back towards the source of the movement to provide a more compact arrangement.

In one embodiment, the pivoting coupler comprises a rocker arm pivotally located on the base structure. Accordingly, a rocker arm may be rotatably located or positioned on the base structure.

In one embodiment, the rocker arm is bent. Having a bent, angled or curved rocker arm helps to accommodate the displacement of the actuator and the damper whilst still retaining the rocker arm within a compact volume.

In one embodiment, the rocker arm has an actuation lever part extending from a pivot which is coupled with the actuator and a damper lever part extending from the pivot which is coupled with the damper. Accordingly, the rocker arm may have two lever parts which may be joined by a pivot part. One of the lever parts may couple with the actuator, whereas the other lever part may couple with the damper. Accordingly, it can be seen that the damper and the actuator couple with opposing parts of the rocker arm.

In one embodiment, the displacement of the actuator in the first direction rotates the rocker arm causing the displacement of the damper in the second direction. Accordingly, movement of the actuator in one direction causes a rotation of the rocker arm which results in a movement of the damper in the second direction.

In one embodiment, the actuator is coupleable with the actuation lever part at different positions along its length. This enables the location of the actuator to be adjusted to suit different loading conditions.

In one embodiment, the damper is coupleable with the damper lever part at different positions along its length. This enables the location of the damper to be adjusted to suit different loading conditions.

In one embodiment, the pair of struts are nested. Nesting or allowing one strut to be slideably received within the volume occupied by the other strut provides for a more compact arrangement.

In one embodiment, the lift mechanism comprises a plurality of the dampers. Accordingly, more than one damper may be provided to suit loading conditions.

In one embodiment, the plurality of the dampers are located on either side of the actuator. Sandwiching the dampers on either side of the actuator provides for a compact arrangement.

In one embodiment, the lift mechanism comprises a plurality of the actuators. Accordingly, more than one actuator may be provided to suit loading conditions.

In one embodiment, the plurality of the actuators are located on either side of the damper. By sandwiching the damper between the actuators provides for a compact arrangement.

In one embodiment, each actuator is coupleable with the at least one strut at different positions along its length. Accordingly, the actuators may be coupleable or connectible with the strut at different locations to suit loading conditions.

In one embodiment, the lift mechanism comprises a gas spring positioned in parallel with the actuator. Providing a spring such as a gas or other compressible spring enables a pre-load to be applied to the struts which assists the operation of the actuator.

In one embodiment, the gas spring is coupled with at least one of the pair of struts. Accordingly, the gas spring may be pivotally or rotatably coupled or connected with the strut.

In one embodiment, the gas spring is coupleable with the at least one strut. Accordingly, the gas spring may be coupled with the same strut as the actuator.

In one embodiment, the gas spring is coupleable with the at least one strut at different positions along its length. Accordingly, the gas spring may be coupled or connected with the strut at different locations to suit loading conditions.

In one embodiment, the gas spring is coupleable with the actuation lever part. Accordingly, the gas spring may also be rotatably or pivotally connected or coupled with the actuation lever part, together with the actuator.

In one embodiment, the gas spring is coupleable with the actuation lever part at different positions along its length. Accordingly, the gas spring may be coupleable or connectible with the actuation lever part at different locations to suit loading conditions.

In one embodiment, the lift platform comprises a translation mechanism operable to translate the lift platform in a direction perpendicular to the elevation direction. Accordingly, the lift platform may have a translation or movement mechanism which translates, moves or extends the lift platform in a direction other than the elevation direction. Typically, the translation mechanism will move the lift platform in a plane defined by that lift platform. Typically, the translation mechanism will move the lift platform in a direction which is transverse to the elevation direction. This enables the lift platform to be extended or retracted laterally with the lift raising or lowering the lift platform elevationally.

According to a second aspect, there is provided a method, comprising: providing a lift having a base structure which pivotally retains a pair of struts which are pivotally coupled with a lift platform; coupling an actuator with at least one of the pair of struts; and coupling a damper with the actuator to dissipate kinetic energy transferred between the lift platform and the actuator.

In one embodiment, the method comprises coupling the damper to dissipate or deplete kinetic energy and/or to accommodate displacement transferred from or caused by the lift platform on the actuator.

In one embodiment, the lift comprises a parallelogram lift and the method comprises locating the struts to be parallel and retaining the lift platform in a fixed attitude during pivoting of the pair of struts to change a height of the lift platform in elevation direction between a lowered position and a raised position.

In one embodiment, the method comprises pivoting the actuator on the at least one of the pair of struts to change the height of the lift platform.

In one embodiment, the method comprises pivotally coupling the actuator with a distal one of the pair of struts.

In one embodiment, the method comprises pivotally coupling the actuator with a distal face of the distal one of the pair of struts.

In one embodiment, the method comprises positioning the actuator to extend through apertures in the pair of struts.

In one embodiment, the actuator comprises a linear actuator and the method comprises changing its length between an extended position in which the lift platform is in the raised position and a retracted position in which the lift platform is in the lowered position.

In one embodiment, the method comprises locating the damper in series with the actuator.

In one embodiment, the method comprises coupling the damper with the base structure.

In one embodiment, the method comprises coupling the damper with the base structure at different positions towards the pair of struts.

In one embodiment, the method comprises pivotally coupling the damper with the actuator.

In one embodiment, the method comprises providing a pivoting coupler and the method comprises translating a displacement of the actuator in a first direction due to the kinetic energy with the pivoting coupler to a displacement of the damper in a second direction.

In one embodiment, the second direction generally opposes the first direction.

In one embodiment, the first direction is generally away from the pair of struts and the second direction is generally towards the pair of struts.

In one embodiment, the method comprises providing a rocker arm as the pivoting coupler and pivotally locating the rocker arm on the base structure.

In one embodiment, the rocker arm is bent.

In one embodiment, the rocker arm has an actuation lever part and a damper lever part extending from a pivot and the method comprises coupling the actuation lever part with the actuator and coupling the damper lever part with the damper.

In one embodiment, the method comprises rotating the rocker arm in response to the displacement of the actuator in the first direction to displace of the damper in the second direction.

In one embodiment, the method comprises coupling the actuator with the actuation lever part at different positions along its length.

In one embodiment, the method comprises coupling the damper with the damper lever part at different positions along its length.

In one embodiment, the method comprises nesting the pair of struts.

In one embodiment, the method comprises providing a plurality of the dampers.

In one embodiment, the method comprises locating the plurality of the dampers on either side of the actuator.

In one embodiment, the method comprises providing a plurality of the actuators.

In one embodiment, the method comprises locating the plurality of the actuators on either side of the damper.

In one embodiment, the method comprises coupling each actuator with the at least one strut at different positions along its length.

In one embodiment, the method comprises positioning a gas spring in parallel with the actuator.

In one embodiment, the method comprises coupling the gas spring with at least one of the pair of struts.

In one embodiment, the method comprises coupling the gas spring with the at least one strut.

In one embodiment, the method comprises coupling the gas spring with the at least one strut at different positions along its length.

In one embodiment, the method comprises coupling the gas spring with the actuation lever part.

In one embodiment, the method comprises coupling the gas spring with the actuation lever part at different positions along its length.

In one embodiment, the method comprises providing a translation mechanism and translating the lift platform in a direction perpendicular to the elevation direction with the translation mechanism.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Before discussing embodiments in any more detail, first an overview will be provided. Embodiments provide a lifting arrangement which is compact and robust. The lifting arrangement has a lifting platform which is coupled via lifting struts with a base structure. The lifting struts are pivotally coupled with the lifting platform and the base structure. Pivoting of the lifting struts on the base structure causes them to rotate about the base structure. The rotation about the base structure causes the lifting platform to be elevated. As the lifting platform is elevated, it maintains its attitude due to the pivotal connection with the lifting struts. An actuator which is pivotally coupled with the base structure actuates to pivot the lifting struts. In order to reduce shock loads on the lifting structure and/or the base structure, a damping mechanism is provided which allows the lifting structure to translate under rapid changes of loading, which also allows the lifting platform to deflect slightly, reducing the shock experience by a load on the lifting platform and/or allows chassis movement to be isolated from the lifting platform. The damping arrangement effectively sits in series with the actuator but, by use of a pivoting coupling, the deflection of the actuator in a first direction due to the shock load is translated to a deflection of the damper in an opposing direction. This enables the damper to be co-located alongside the actuator, providing a more compact structure.

Personal Mobility Vehicle

Figure 1A:
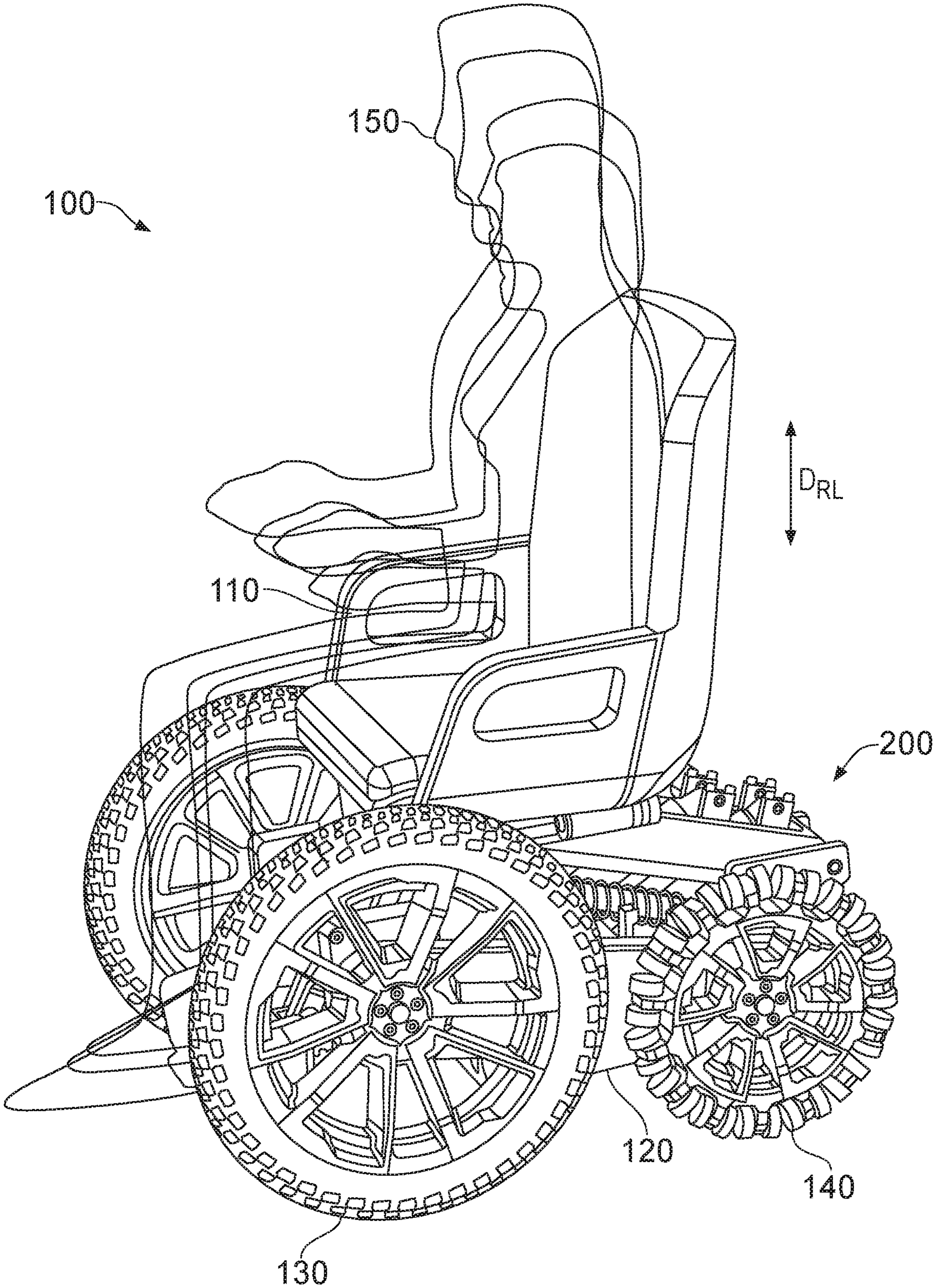
FIGS. 1A and 1B illustrate a personal mobility vehicle according to one embodiment.

FIG. 1A illustrates a personal mobility vehicle 100, such as a wheelchair, according to one embodiment. The wheelchair has a seat 110 coupled with a chassis 120. Also coupled with the chassis 120 is a pair of front wheels 130 and a pair of omniwheels 140. Motors (not shown) provide power to at least the front wheels 130 and preferably to the omniwheels

140 to move the personal mobility vehicle 100 under the control of the occupant 150. The seat 110 is shown in a lowered position with the seat being at its lowest height elevation.

Figure 1B:
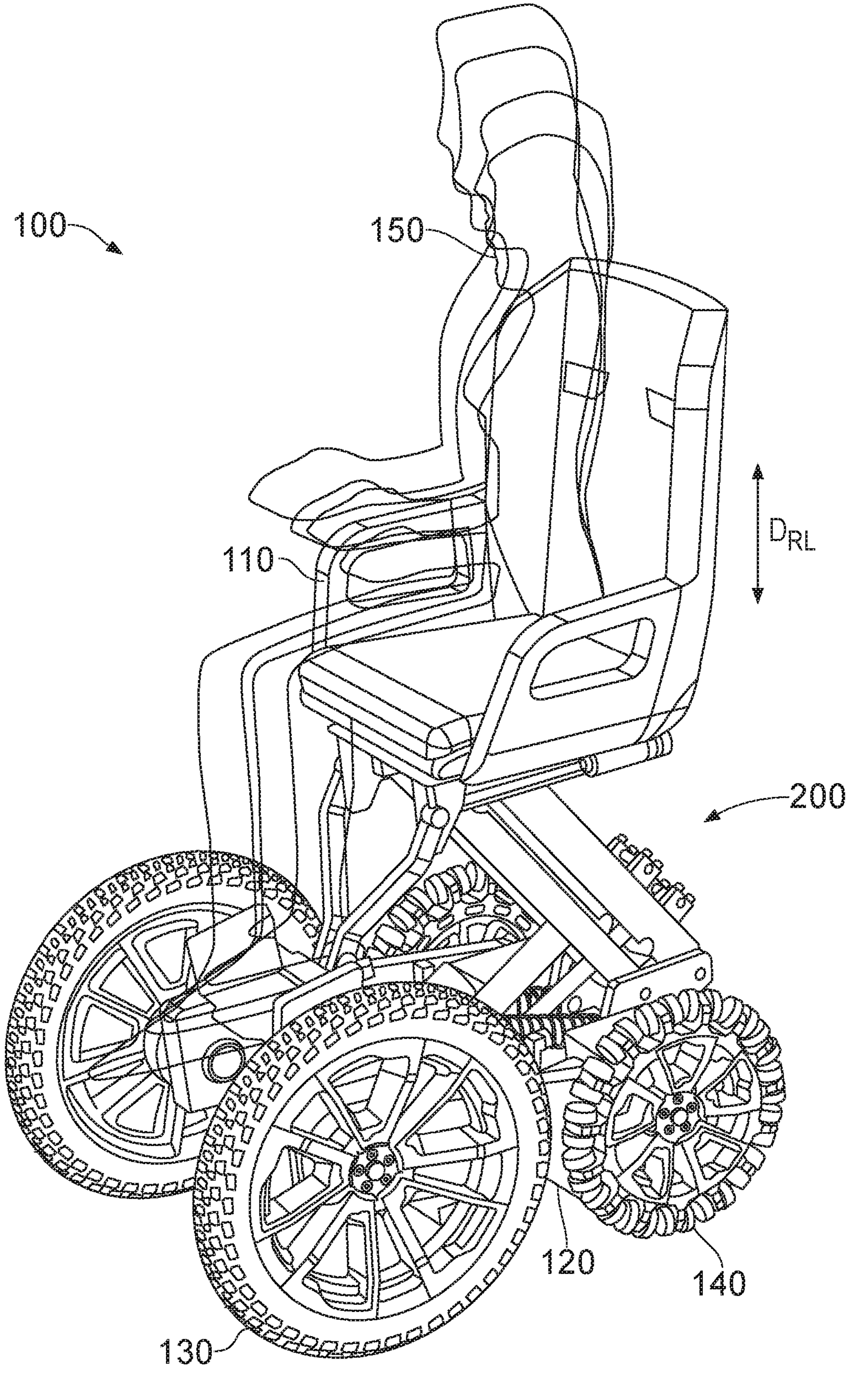

FIG. 1B shows the arrangement with the seat 110 in its raised position, with the seat being at its most elevated height. As will be described in more detail below, operation of a lifting mechanism 200 causes the seat 110 to transition between the lowered and raised positions in the direction $D_{RL}$. Although this embodiment is described with reference to the personal mobility vehicle, it will be appreciated that the lifting mechanism may be employed in other situations to raise and lower a person or similar load.

Lifting Mechanism

Figure 2A:
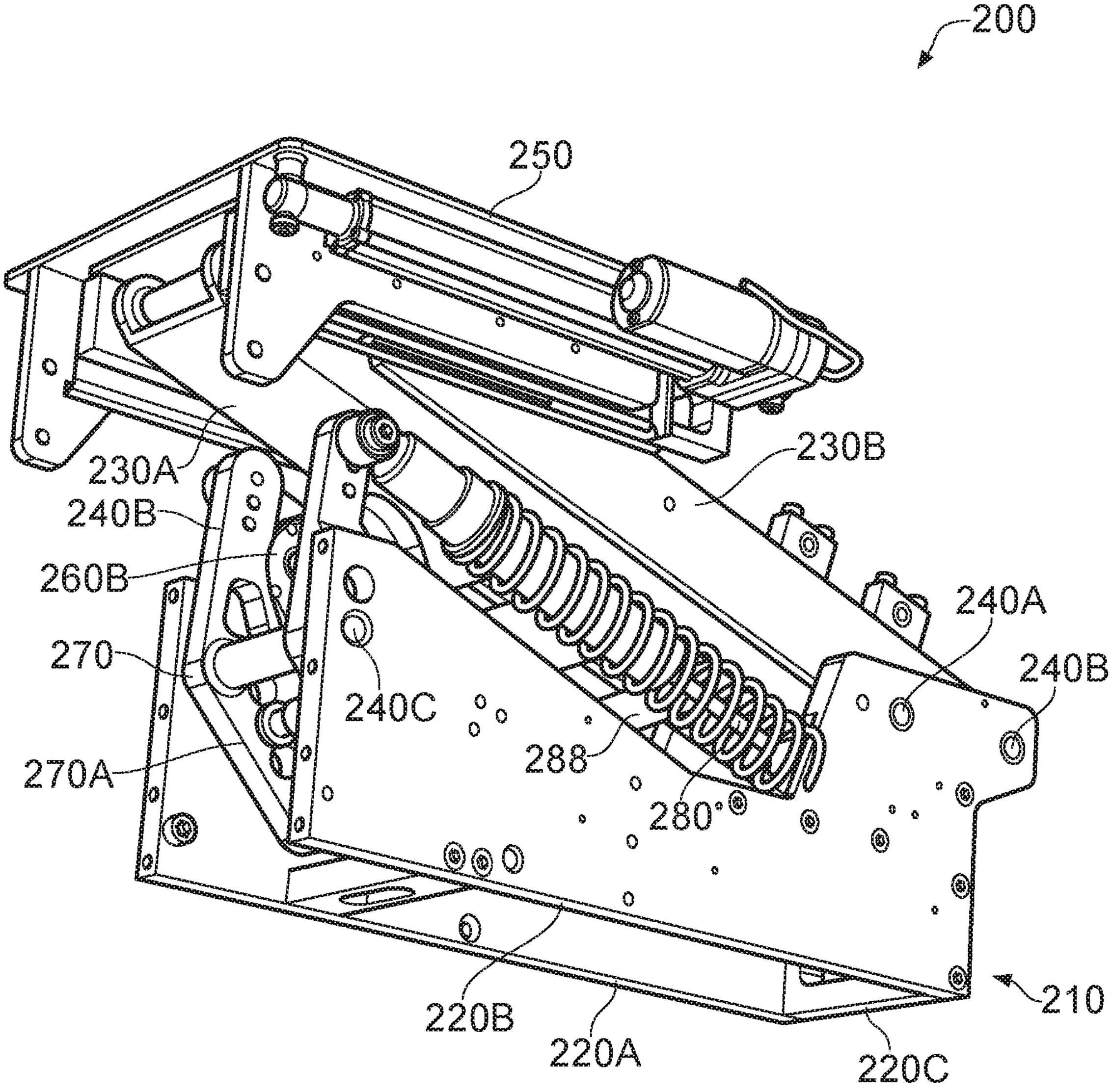
FIGS. 2A and 2B illustrates the lifting mechanism according to one embodiment in more detail.
Figure 2B:
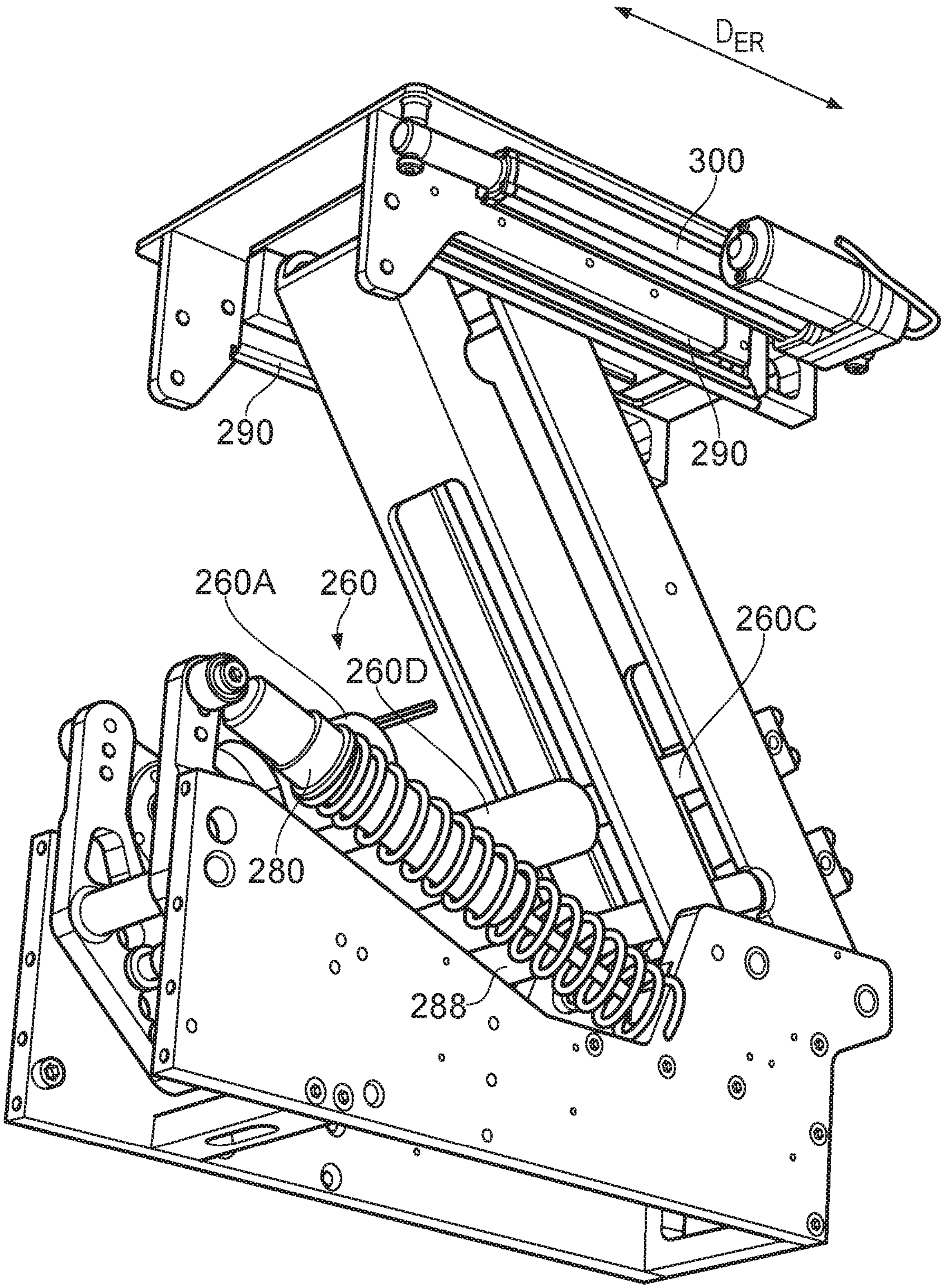

FIGS. 2A and 2B illustrate the lifting mechanism 200 according to one embodiment in more detail. Other components of the personal mobility vehicle 100 have been omitted to improve clarity. Abase structure 210 is provided. The base structure 210 comprises a pair of upstanding side walls 220A, 220B in the form of generally rectangular plates connected by an end wall 220C. The sidewalls 220A, 220B and end wall 220C form a three-sided structure, which has an open end opposing the end wall 220C, together with an open base and open top.

Lifting Struts

A pair of lifting struts 230A, 230B are pivotally connected with the sidewalls 220A, 220B. In particular, the pivot bars 240A, 240B supporting the lifting struts 230A, 230B are received by bearings located in apertures on the sidewalls 220A, 220B to facilitate pivotal rotation of the lifting struts 230A, 230B with respect to the base structure 210. The lifting struts 230A, 230B are elongate and have a C-shaped cross-section. The dimensioning of the lifting strut 230A with respect to the lifting strut 230B is such that the lifting strut 230A may be received within an inner void defined by the lifting strut 230B as the lifting mechanism 200 transitions to its lowered position. In other words, the lifting struts 230A, 230B may be nested. The lifting struts 230A, 230B are provided with apertures located towards a first longitudinal end of the lifting struts 230A, 230B which receive the respective pivot bars 240A, 240B therewithin.

The lifting struts 230A, 230B are pivotally coupled with a lifting platform 250 in a similar fashion. The fixed pivot points of the lifting struts 230A, 230B on the base structure 210, in combination with the fixed pivot points of the lifting struts 230A, 230B on the lifting platform 250, ensure that the lifting platform 250 maintains the same attitude as it transitions between the lowered and elevated positions.

Actuator

An actuator 260 is provided which is operated to change its longitudinal or elongate length. In this example, a motor 260A can be energized to rotate and the rotation is transmitted through a gear box 260B to a screw actuator in order to vary the length of an actuation strut 260C extending from an actuation body 260D. The actuator 260 is coupled at a first end with a pivot coupling 270 and is connected at another end with the distal face of the lifting strut 230B. Coupling with the distal face of the lifting strut 230B maximises the length of the actuator 260 when the lifting mechanism 200 is in the lowered position. As can be seen, the actuator 260 extends through apertures formed in the lifting struts 230A, 230B. Both the lifting strut 230B and the pivot coupling 270 are provided fixings to allow the actuator 260 to be connected at a variety of different positions along their length.

Gas Strut

Positioned alongside the actuator 260 is a gas strut 288 or similar compression device. One elongate end of the gas strut 288 is also coupled with the pivot coupling 270, with the other elongate end of the gas strut 288 being coupled with the distal face of the lifting strut 230B. The gas strut 288 is typically pre-compressed and operates to provide a lifting force to aid the operation of the actuator 260. The lifting mechanism 200 geometry in the platform's lowest positions provides poor mechanical advantage and the gas strut 288 augments the actuator 260 preventing overload. This also allows for reduced energy consumption by storing energy in the gas strut 288 to later help lift the platform. Both the lifting strut 230B and the pivot coupling 270 are provided fixings to allow the gas strut 288 to be connected at a variety of different positions along their length.

Pivot Coupling

The actuator 260 and the gas strut 288 are pivotally connected with an actuation lever 270A of the pivot coupling 270. The pivot coupling 270 is pivotally connected with the sidewalls 220A, 220B in a similar manner to that described above. This enables the pivot coupling to pivot about a pivot bar 240C extending between the sidewalls 220A, 220B. The pivot coupling 270 also has a damper lever 270B.

The damper lever 270B and the actuation lever 270A extend away from an aperture which receives the pivot bar 240C in divergent directions to form a rocker arm. The internal angle between the elongate axis of the actuation lever 270A and the damper lever 270B is typically less than 180 degrees. The pivot coupling 270 is shaped as a rocker arm in order to retain the component parts of the lifting mechanism 200 within the elongate volume defined by the base structure 210 at any elevation of the lifting mechanism 200. Both the damper lever 270B and the actuation lever 270A are provided fixings to allow the actuator 260 and the damper 280 to be connected at a variety of different positions along their length.

Dampers

A pair of dampers 280 is pivotally connected with the damper lever 270B at one elongate end. The other elongate end of the damper 280 is pivotally connected with the sidewalls 220A, 220B. Both the sidewalls 220A, 220B and the damper lever 270B are provided fixings to allow the dampers to be connected at a variety of different positions along their length.

Lifting

Figure 3A:
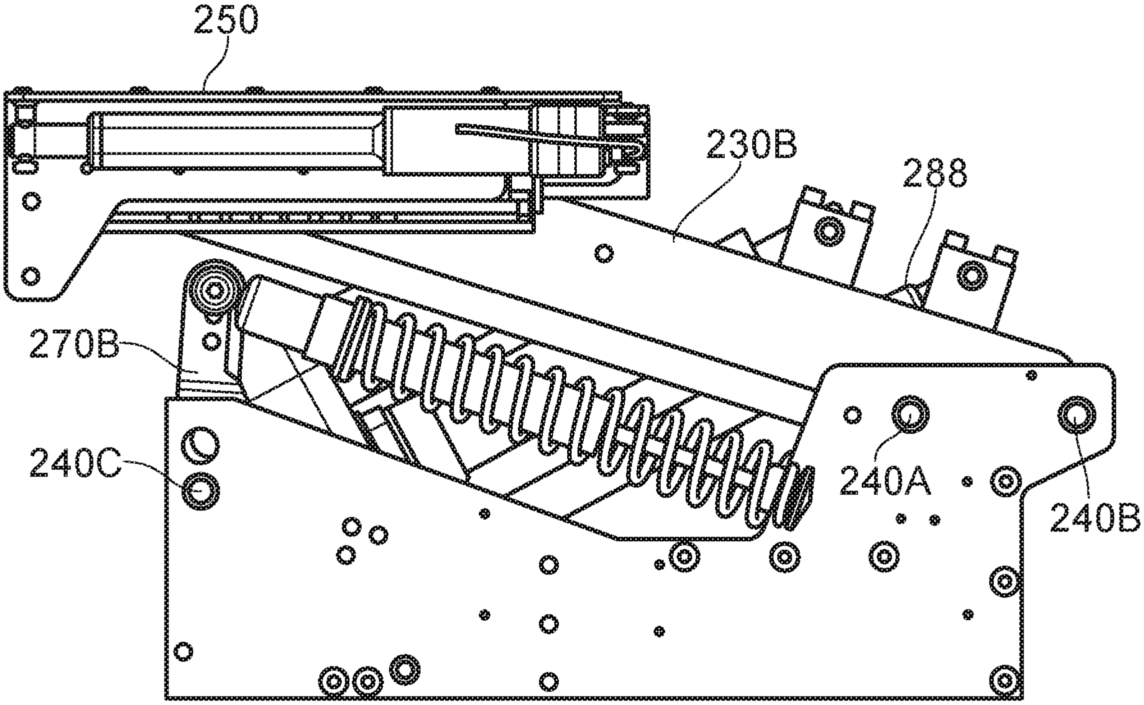
FIGS. 3A and 3B are side views of the lifting mechanism.

FIG. 3A is a side view of the lifting mechanism 200 with the lifting platform 250 at its lowered position. As can be seen, the actuator 260 is at its shortest extension and the lifting struts 230A (not visible), 230B are at their least elevated. The gas strut 288 is also at its most compressed and so provides its greatest amount of force bearing on the lifting strut 230B.

Figure 3B:
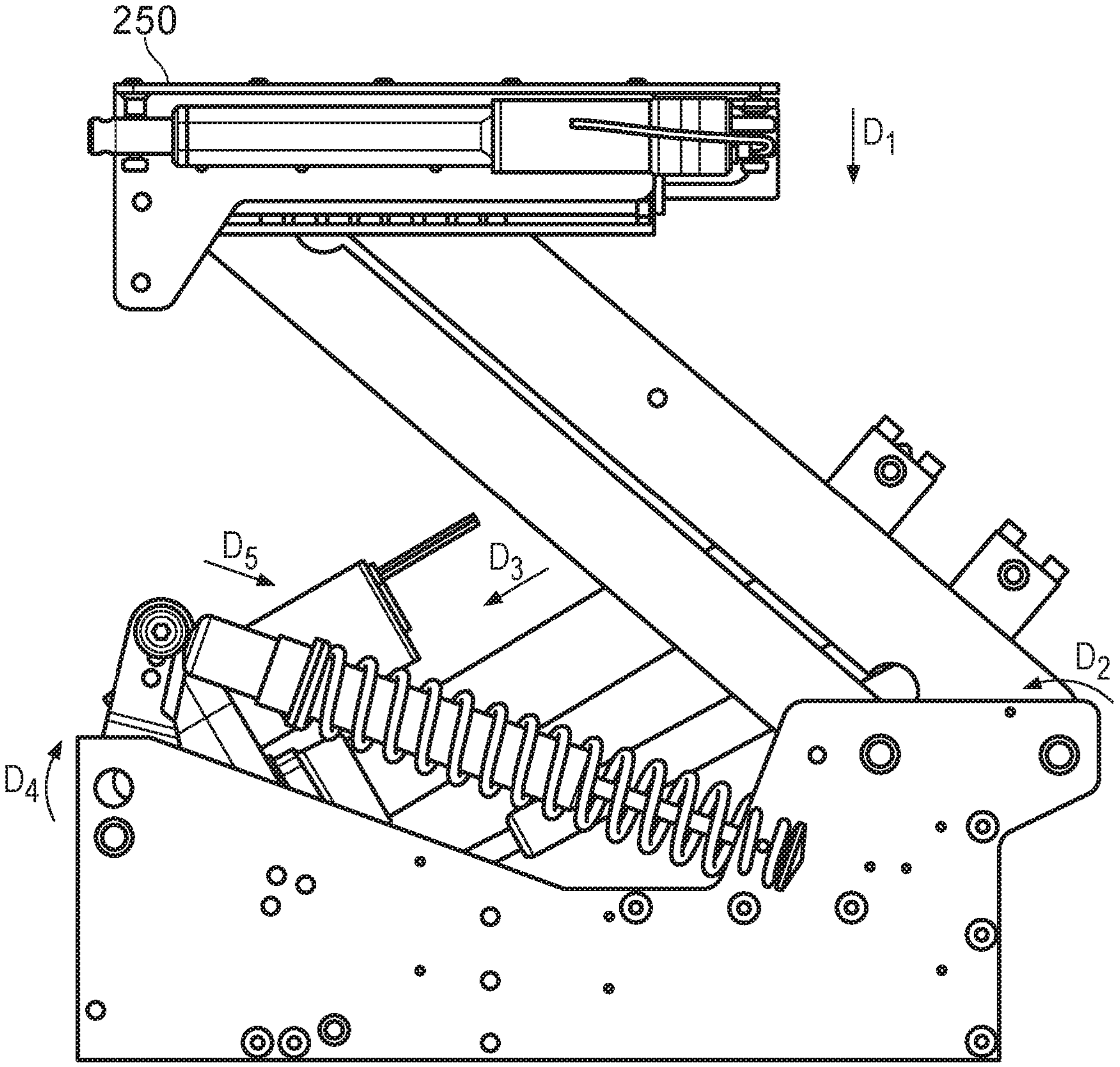

When it is desired to increase the elevation of the lifting platform 250, the actuator 260 is operated to extend its elongate length in order to apply a force to the lifting strut 230B. That lifting force is assisted by the force supplied by the compressed gas strut 288. This causes pivoting of the lifting strut 230B which elevates the lifting platform 250, which maintains its attitude due to the lifting strut 230A as shown in FIG. 3B which shows the lifting platform 250 at an elevated position.

Lowering

To lower the lifting platform 250, the reverse operation occurs, in that the actuator 260 is operated to reduce its elongate length; this compresses the gas strut 288 as the lifting strut 230B pivots about the base structure 210.

Platform Extension

The lifting platform 250 is retained by a pair of extension struts 290 which are operated by a linear actuator 300. Extension and retraction of the linear actuators 300 move the lifting platform 250 along the extension-retraction direction $D_{ER}$, which is transverse to the raise-lower direction $D_{RL}$.

Different configurations of the height and extension of the lifting platform suit different operating conditions of the personal mobility vehicle 100. For example, fully lowered and fully extended is suited to sitting at a table or desk. Fully raised and partially extended is suited to standing conversation. Partially raised and fully retracted is suited to fast movement.

Shock Load

As best illustrated in FIG. 3B, a shock load on the lifting mechanism 200, typically due to an impulse on the lifting platform 250 in the direction D1 (due, for example, to a user sitting rapidly onto the seat supported by the lifting platform when moving onto the personal mobility vehicle 100 or as a result of the personal mobility vehicle 100 moving over uneven terrain), causes a consequential rotation of the lifting strut 230B in the direction D2. This rotation in the direction D2 causes a force on the actuator 260 in the direction D3.

If the actuator 260 were rigidly fixed to the base structure 210, then those forces would need to be borne by the components of the lifting mechanism 200, typically at the pivot points, which can lead to stress in the structure as well as shock to any load on the lifting platform 250 or on the actuator 260 itself.

However, the provision of the damper 280 dissipates the energy, thus reducing the load on the lifting mechanism 200 and reducing the shock experienced by the load. The rapid change in load on the actuator 260 caused by the rapid change in load on the lifting platform 250 and conveyed to the actuator 260 through the lifting strut 230B results in a displacement of the damper 280 which absorbs the energy transferred during such displacement and allows a displacement of the actuator 260, together with a displacement of the lifting struts 230A and the lifting platform 250. In particular, the movement of the actuator 260 in the direction D3 results in a rotation of the pivot coupling 270 in the direction D4 and results in a displacement of the dampers 280 in the direction D5 which generally opposes the direction D3. This allows the lifting mechanism 200 to absorb shock forces experienced by the lifting platform 250, resulting in reduced shock to the component parts of the lifting mechanism 200 and reduced shock to the load through the movement of the lifting platform 250. The particular arrangement whereby the actuator 260 is coupled with the damper 280 through the pivot coupling 270 provides for a compact structure where the dampers 280 are positioned in parallel with the actuator 260 but the actuator 260 and the dampers 280 are mechanically in series.

Although the embodiment mentioned above envisages a single gas spring and actuator and a pair of dampers, it will be appreciated that more or fewer could be provided. In one arrangement, the arrangement is reversed with a single damper provided with a pair of gas springs and/or actuators. In one arrangement, no gas spring is provided. In one arrangement, a single damper and provided with a single actuator.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

The invention claimed is:

1. A personal lift mechanism, comprising:

a lift having a base structure which pivotally retains a pair of struts which are pivotally coupled with a lift platform;

an actuator coupled with at least one of said pair of struts; and a damper coupled with said actuator and operable to dissipate kinetic energy transferred from said lift platform to said actuator; and a pivoting coupler and wherein a displacement of said actuator in a first direction due to said kinetic energy is translated by said pivoting coupler to a displacement of said damper in a second direction;

wherein said pivoting coupler comprises a rocker arm pivotally located on said base structure; and wherein said rocker arm has an actuation lever part extending from a pivot which is coupled with said actuator and a damper lever part extending from said pivot which is coupled with said damper.

2. The personal lift mechanism of claim 1, wherein said lift comprises a parallelogram lift, said struts are located to be parallel and said lift is operable to retain said lift platform in a fixed attitude during pivoting of said pair of struts to change a height of said lift platform in elevation direction between a lowered position and a raised position.

3. The personal lift mechanism of claim 1, wherein said actuator is pivotally coupled with a distal one of said pair of struts.

4. The personal lift mechanism of claim 1, wherein said damper is located in series with said actuator.

5. The personal lift mechanism of claim 1, wherein said actuator is positioned to extend through apertures in said pair of struts.

6. The personal lift mechanism of claim 1, wherein said second direction generally opposes said first direction.

7. The personal lift mechanism of claim 1, wherein said first direction is generally away from said pair of struts and said second direction is generally towards said pair of struts.

8. The personal lift mechanism of claim 1, wherein said pair of struts are nested.

9. The personal lift mechanism of claim 1, comprising a gas spring positioned in parallel with said actuator.

10. The personal lift mechanism of claim 1, wherein said lift platform comprises a translation mechanism operable to translate said lift platform in a direction perpendicular to said elevation direction.

11. A personal lift mechanism, comprising:

a lift having a base structure which pivotally retains a pair of struts which are pivotally coupled with a lift platform;

an actuator coupled with at least one of said pair of struts;

a damper coupled with said actuator and operable to dissipate kinetic energy transferred from said lift platform to said actuator; and a pivoting coupler and wherein a displacement of said actuator in a first direction due to said kinetic energy is translated by said pivoting coupler to a displacement of said damper in a second direction, wherein said pivoting coupler comprises a rocker arm pivotally located on said base structure; and wherein said displacement of said actuator in said first direction rotates said rocker arm causing said displacement of said damper in said second direction.

12. The personal lift mechanism of claim 11, wherein said lift comprises a parallelogram lift, said struts are located to be parallel and said lift is operable to retain said lift platform in a fixed attitude during pivoting of said pair of struts to change a height of said lift platform in elevation direction between a lowered position and a raised position.

13. The personal lift mechanism of claim 11, wherein said actuator is pivotally coupled with a distal one of said pair of struts.

14. The personal lift mechanism of claim 11, wherein said damper is located in series with said actuator.

15. The personal lift mechanism of claim 11, wherein said actuator is positioned to extend through apertures in said pair of struts.

16. The personal lift mechanism of claim 11, wherein said second direction generally opposes said first direction.

17. The personal lift mechanism of claim 11, wherein said first direction is generally away from said pair of struts and said second direction is generally towards said pair of struts.

18. The personal lift mechanism of claim 11, wherein said pair of struts are nested.

19. The personal lift mechanism of claim 11, comprising a gas spring positioned in parallel with said actuator.

20. The personal lift mechanism of claim 11, wherein said lift platform comprises a translation mechanism operable to translate said lift platform in a direction perpendicular to said elevation direction.

* * * * *